United States Patent
Drouin et al.

(10) Patent No.: US 8,606,410 B2
(45) Date of Patent: Dec. 10, 2013

(54) DRIVE METHOD FOR STARTING AND OPERATING A RESONANT SCANNING MEMS DEVICE AT ITS RESONANT FREQUENCY

(75) Inventors: David Drouin, Milpitas, CA (US); David Hu, Los Altos, CA (US); Sung Chung, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 301 days.

(21) Appl. No.: 12/803,522

(22) Filed: Jun. 29, 2010

(65) Prior Publication Data

US 2011/0320046 A1 Dec. 29, 2011

(51) Int. Cl.
*G05B 13/00* (2006.01)
(52) U.S. Cl.
USPC .......................... 700/280; 235/454; 358/474
(58) Field of Classification Search
USPC ................... 700/275, 280; 235/454; 358/474
See application file for complete search history.

(56) References Cited

U.S. PATENT DOCUMENTS

| | | | |
|---|---|---|---|
| 6,497,141 B1 | 12/2002 | Turner et al. | |
| 6,674,383 B2 | 1/2004 | Horsley et al. | |
| 6,781,739 B1 | 8/2004 | Amm et al. | |
| 6,812,669 B2 | 11/2004 | Hagen | |
| 6,933,873 B1 | 8/2005 | Horsley et al. | |
| 6,956,350 B2 | 10/2005 | Hagen | |
| 6,965,177 B2 | 11/2005 | Turner et al. | |
| 6,985,271 B2 | 1/2006 | Yazdi et al. | |
| 7,088,070 B2 | 8/2006 | Hagen | |
| 7,428,353 B1 | 9/2008 | Milanovic et al. | |
| 7,442,918 B2 | 10/2008 | Sprague et al. | |
| 7,485,485 B2 | 2/2009 | Linden et al. | |
| 7,515,329 B2 | 4/2009 | Sprague et al. | |
| 7,545,237 B2 | 6/2009 | Hagelin et al. | |
| 2002/0145042 A1* | 10/2002 | Knowles et al. | 235/462.01 |
| 2003/0034387 A1* | 2/2003 | Knowles et al. | 235/375 |
| 2003/0071122 A1* | 4/2003 | Tsikos et al. | 235/454 |
| 2003/0085281 A1* | 5/2003 | Knowles et al. | 235/454 |
| 2004/0256921 A1 | 12/2004 | Turner et al. | |
| 2005/0075572 A1* | 4/2005 | Mills et al. | 600/459 |
| 2005/0173770 A1* | 8/2005 | Linden et al. | 257/414 |
| 2005/0253055 A1 | 11/2005 | Sprague et al. | |
| 2005/0280879 A1* | 12/2005 | Gibson et al. | 358/474 |
| 2006/0086794 A1* | 4/2006 | Knowles et al. | 235/454 |
| 2006/0241545 A1* | 10/2006 | Madsen et al. | 604/9 |
| 2007/0012777 A1* | 1/2007 | Tsikos et al. | 235/454 |
| 2007/0166034 A1 | 7/2007 | Tremaine | |
| 2007/0200648 A1* | 8/2007 | Reichenbach et al. | 333/133 |
| 2008/0042052 A1 | 2/2008 | Sprague et al. | |
| 2009/0086300 A1 | 4/2009 | Blake | |
| 2009/0149999 A1* | 6/2009 | Schramm et al. | 700/280 |

OTHER PUBLICATIONS

PCT Search Report, Headway Technologies, PCT/US 11/01153 Mail date—Oct. 27, 2011.

* cited by examiner

*Primary Examiner* — Mohammad Ali
*Assistant Examiner* — Anthony Whittington
(74) *Attorney, Agent, or Firm* — Saile Ackerman LLC; Stephen B. Ackerman

(57) ABSTRACT

The resonance frequency of a forced torsionally oscillating mirror MEMS device can be controlled in the presence of perturbations by means of a closed loop feedback device and method of using it. The method is implemented through a simple algorithm, implemented in either software or hardware, that maintains the condition of resonance, or another selected frequency, by recursively determining that the center of the driving voltage pulse is positioned at a point on the measured positional waveform of the oscillating system.

23 Claims, 6 Drawing Sheets

DRIVE METHOD FOR STARTING AND OPERATING A RESONANT SCANNING MEMS DEVICE AT ITS RESONANT FREQUENCY

BACKGROUND OF THE INVENTION

1. Field of the Invention

This invention relates generally to the operation of a micro-electromechanical system (MEMS) device, particularly to such a device that includes a scanning mirror that operates at a resonant frequency.

2. Description of the Related Art

The scanning of optical beams by rapidly oscillating mirrors of a MEMS (micro-electromechanical system) assembly is an important aspect of devices such as displays and barcode scanners. In many applications, the oscillations must be continuously maintained at a resonant frequency, which may be subject to destabilizing perturbations such as variations in ambient temperature and air pressure. These perturbations act by affecting the device characteristics that determine its resonant frequency. Clearly, a mechanism that would tend to stabilize operation at the resonant frequency of such a MEMS device would be of considerable importance.

The present MEMS is a mirror operating as a forced torsional oscillator. The force is applied to the mirror by means of a pulse train producing a time varying, periodic, pulsed electric field between the opposite ends of the mirror and electrodes of a fixed substrate.

Referring to FIG. 1A, (a)-(f), there is shown, schematically, a sequence of positions of such an oscillating mirror (6) resulting from the combination of an impressed series of periodic driving voltage pulses applied to the mirror by electrical contact with the voltage source (not shown) at its axis of rotation (5) of the mirror, together with a spring-like (torsional) restoring torque applied by the angular motion of the axis of rotation itself. The pulses produce a force between each of the opposite lateral ends (1) and (2) of the movable mirror and corresponding fixed ends (3) and (4) of the substrate electrodes. These electrostatic forces will vary with the angular position of the mirror (relative to its horizontal position in (a), for example) due to the finite surface areas of the moving mirror and stationary portions of the electrodes and their relative separations. The spring-like restoring force about the axis of rotation (caused, for example, by the physical twisting of the axis) tends to bring the mirror back to the neutral, horizontal position shown in (a), (c), and (e). However, perturbations caused by slight mechanical imbalances, will allow motion to be initiated, little by little, from a position at rest.

Each of the separate images (a)-(f) is a schematic representation of the position of the mirror at a slightly later time (see downward directed arrow of increasing time) and each of the numerals (1) through (6), are understood to represent the same features of the device in each successive illustration. Alongside the figures there is drawn a representation of a portion of a pulse train composed of square waves, that produce a driving voltage waveform that varies between zero and some nominal voltage, denoted HV. These pulses are progressively (in time) applied between the movable mirror and the fixed substrate, so that the voltage falls to zero at position (100), remains at zero until position (101) where it rises to HV, and then returns to zero at position (102).

Referring to FIG. 1B, there is shown schematically how a fixed light source, (35) can direct a beam of light (dashed line) onto the mirror (6) and have it reflect into an appropriately located photosensor (45). As the mirror rotates, the variation in angular position of the reflected beam, as detected by the photosensor, can be used to determine the corresponding amount of mirror deflection. This method, in fact, will be used to generate positional waveforms for the rotating mirror during the operation of the MEMS device.

Referring now to FIG. 1C, there is shown a schematic top-view of the same device of which FIG. 1A is a side-view. The device, which is shown here in an exemplary form, includes six identical mirror portions, labeled (10)-(15), affixed to a common shaft (5), which serves as an axis of rotation and a source of spring-like restoring torque. In FIG. 1A, the six mirror portions appeared as a single portion. The ends of each of the mirror portions (1) and (2), are interleaved between fin-like extensions of opposite ends (20) and (30) of electrodes fixed to the substrate of the device.

Returning again to FIG. 1A, (a), the mirror is shown in a horizontal position with its ends centered between the fins of the fixed substrate and there is a zero voltage at each end of the mirror. When a voltage appears on the mirror corresponding to the rise of the voltage pulse to V at (100), it is understood that a slight initial angular perturbation allows the voltage to move the mirror in a counter-clockwise direction to position (b), while the voltage remains at V.

Referring next to FIG. 1A (b), it is shown that the voltage at (101) has returned to zero, allowing the torsional force of the axis to return the mirror to its neutral position at (c). The remaining figures, FIG. 1A (d) to FIG. 1A (f) and beyond are a continuation of this periodic process.

The operation of the MEMS requires that it be forced into a resonant oscillatory mode by a periodic driving signal and then maintained in that mode during whatever ambient changes in temperature and air pressure occur to alter the resonant frequency of the structure. To achieve this object the system must be able to both continually measure the actual rotational frequency of the MEMS and to then make corrections to that frequency when it falls outside of acceptable resonance values. The prior arts listed below all include methods to achieve this object, but none are able to do so in a simple, efficient and cost-saving way.

Linden et al. (U.S. Pat. No. 7,485,485) discloses a closed loop system to control phase, amplitude and resonance frequency of a MEMS scanner.

Gibson et al. (US Patent Appl. 2005/0280879) describes operation of a MEMS scanner close to its resonance frequency by resonance frequency control.

Yazdi et al. (U.S. Pat. No. 6,985,271) uses capacitance to detect the position of a mirror and a closed loop feedback control.

Horsley et al. (U.S. Pat. No. 6,674,383) and (U.S. Pat. No. 6,933,873) varies and measures the position of an electrostatic actuator using a pulse width modulated (PWM) pulse train.

Turner et al. (U.S. Pat. No. 6,497,141) drives MEMS structures at parametric frequencies to permit precise switching between stable and unstable operation.

Hagelin et al. (U.S. Pat. No. 7,545,237) shows a MEMS device having a serrated tooth surface.

Amm et al. (U.S. Pat. No. 6,781,739) discloses a high frequency drive for MEM devices.

Hagen (U.S. Pat. No. 6,812,669) separates amplitude and wave shape inputs to a MEMS device to allow use of an inexpensive DAC to control the device.

Sprague et al. (U.S. Pat. No. 7,515,329) and (U.S. Pat. No. 7,442,918) drives a MEMS oscillator by applying torque to support arms.

Milanovic et al. (U.S. Pat. No. 7,428,353) provides MEMS device control using filtered voltage signal shaping.

SUMMARY OF THE INVENTION

A first object of this invention is provide a method to maintain the oscillation of a resonant MEMS mirror device at (or within an acceptable range of) its resonant frequency.

A second object of this invention is to provide such a method that maintains oscillation at a resonant frequency of the mirror device despite variations in parameters that affect the frequency.

A third object is to provide such a method that also provides a quick determination of the resonant frequency of the subject MEMS device so that the required control can be maintained.

A fourth object of the invention is to provide a quick and reliable startup of the resonant motion of the MEMS.

These objects will be achieved by means of a closed loop method that avoids the prior art approach that requires a sweep of the drive frequency to obtain information on amplitude vs. frequency in order that the resonant frequency can be obtained. The present closed loop method continually monitors the position of the mirror by optical or electronic means (or their combination) to obtain a relationship between the angular phase of the mirror and the phase of the driving waveform. This phase relationship is then maintained at a constant value by an algorithmically controlled sweep of the driving frequency operating within a closed feedback loop. The operation of the algorithm causes the phase relationship to converge to its proper value at the start of each pulse of the driving voltage.

DESCRIPTION OF THE PREFERRED EMBODIMENTS

The preferred embodiment of the present invention is a MEMS device, comprising an electrostatically driven oscillating mirror, undergoing forced torsional oscillations under the combined action of the electrostatic force and a spring-like restoring force. The resonant frequency of this MEMS device is measured and maintained by a closed-loop feedback system in the presence of perturbations that can alter the resonant frequency. It is noted that the method is equally applicable for measuring and maintaining any desired frequency of the system.

Figure 2:
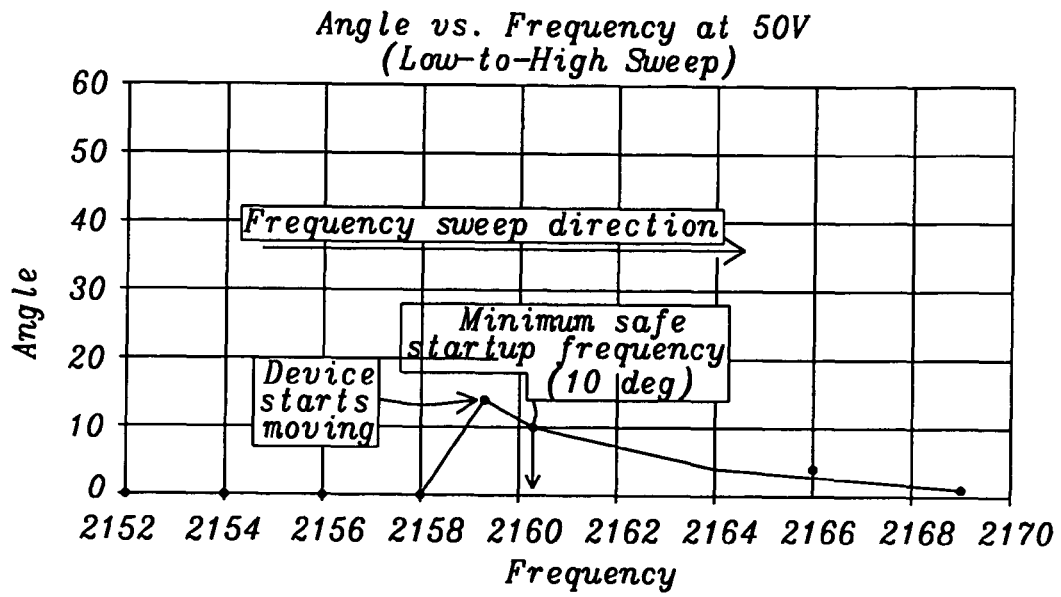
FIG. 2 is a graphical representation of the relationship between the peak-to-peak optical angle of an oscillating mirror vs. drive frequency at a nominal voltage, as the frequency is swept from a low to a high value.

Referring to FIG. 2, there is shown a graph of driving frequency vs. peak-to-peak optical angle as might be measured by the reflection of an optical beam from the mirror surface, for a particular nominal operating voltage, (50V in the present example) as the driving frequency is swept from a low frequency to a higher frequency. At some frequency during this sweep, the device begins to resonate (here, at approx. 2159 Hz). This frequency is defined as the "critical startup frequency." The "minimum safe startup frequency" is this critical startup frequency plus some additional tolerance amount to account for an expected operating temperature range. For the example shown, the minimum safe startup frequency is chosen to be 2160.3 Hz.

Figure 3:
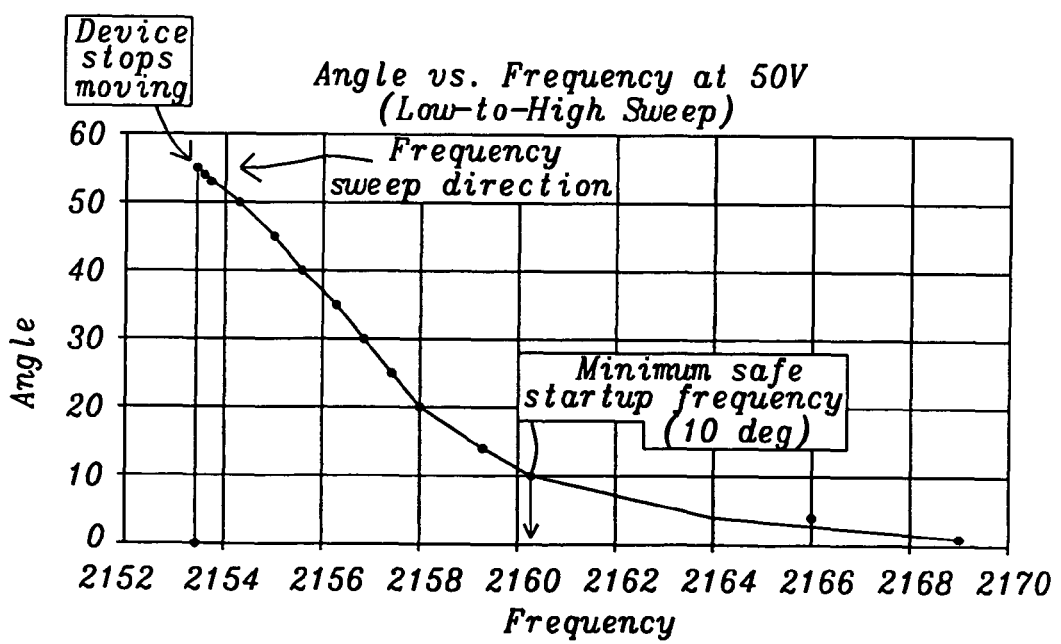
FIG. 3 is a graphical representation of the relationship between the peak-to-peak optical angle of an oscillating mirror vs. drive frequency at a nominal voltage, as the frequency is swept from a high to a low value.

Referring next to FIG. 3, there is shown (as in FIG. 2) the peak-to-peak optical angle of the mirror versus frequency for a particular nominal voltage (50 V) as the device drive frequency is swept from a high frequency (above which no mirror oscillation occurs) to a lower frequency. Here the high frequency is approximately 2169 Hz, and the sweep goes down to approximately 2153.5 Hz, at which point the mirror stops moving.

To start up the device from its motionless state, the device is first driven at a frequency greater than or equal to its minimum safe startup frequency (as determined in FIG. 2). Then the frequency is reduced until the target operating frequency is achieved. If the driving frequency is lowered below the resonant frequency, the device will stop moving (as seen here). Due to the high-Q of the MEMS, there is significant angle overshoot when the frequency is stepped by large amounts. This overshoot could cause a problem if it causes the oscillations to stop completely due to the critical resonant frequency being surpassed. To eliminate this possibility of unintended frequency overshoot, the frequency step size and/or dwell time for each frequency step needs to be varied in such a way as to minimize the overshoot. In typical startup methods, the frequency step size and dwell time are chosen so that the device reaches the target operating frequency without the angle overshooting so significantly as to cause the motion to reach the critical angle/frequency at which motion stops. Once the device is operating at its target frequency, the drive voltage and/or drive voltage duty cycle can be varied to maintain both the desired angle and desired oscillation amplitude.

Figure 4:
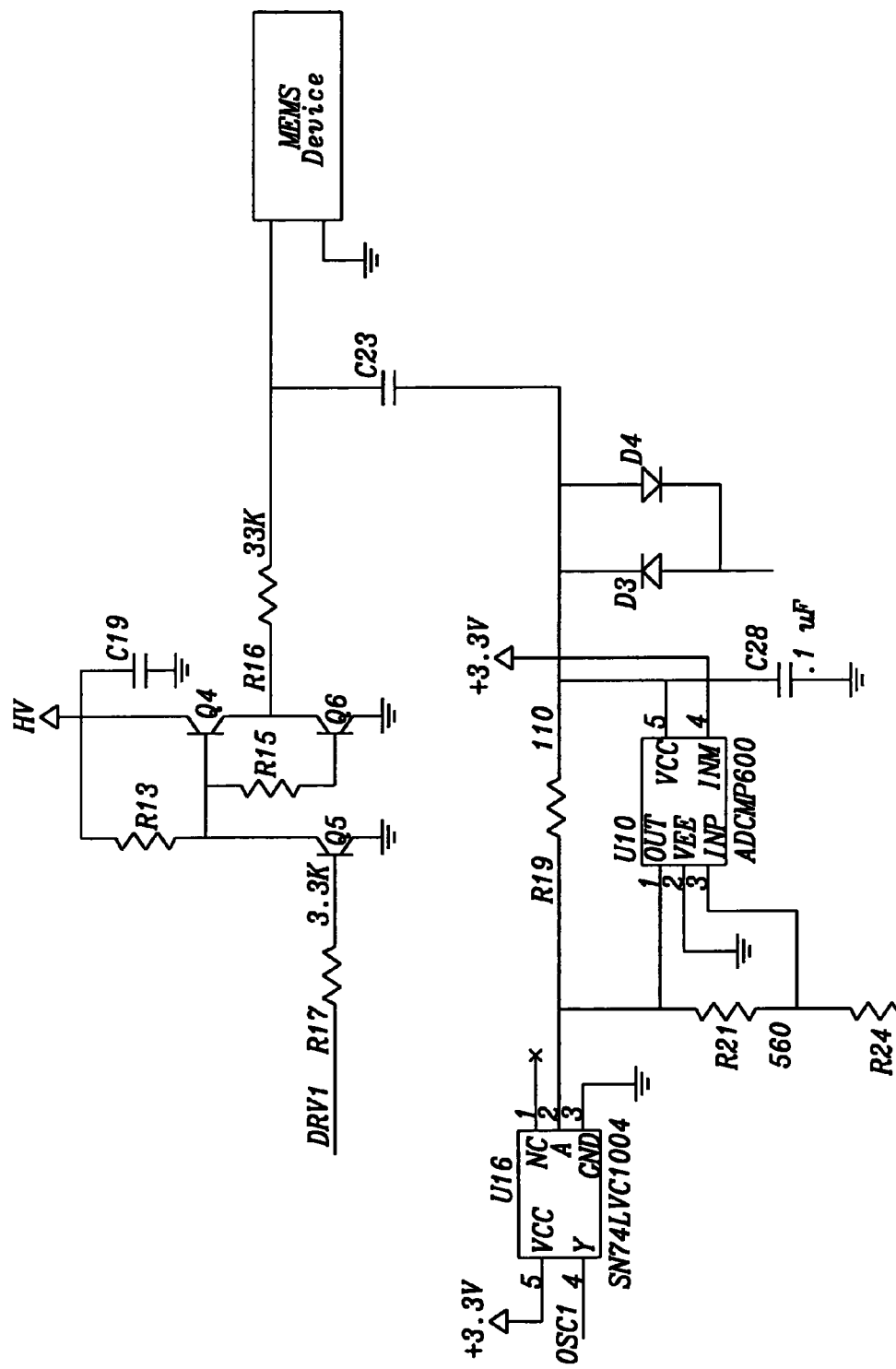
FIG. 4 illustrates a typical electronic circuit used to control the MEMS mirror high voltage signals and to sense variations in the capacitance of the system.

Referring next to FIG. 4, there is shown an exemplary electronic circuit that has been used to drive the MEMS device (see box labeled "MEMS Device") through generation of high-voltage (HV) signals of various frequencies and waveforms and to sense the capacitance between the moving and stationary portions of the MEMS. Note that because the MEMS device is an oscillator, it has a frequency that is proportional to its capacitance. Thus, to the electronic circuit, the MEMS device "looks like" a capacitor that is connected between the circuit and ground.

The signal denoted VMID, is an input connected to a fixed (3.3 V/2) reference voltage. The signal denoted DRV1 is a LVTTL (Low Voltage Transistor-Transistor Logic) signal input that, when low, supplies the HV level to the MEMS device. The signal denoted OSC1 is the output of an oscillator that generates a frequency inversely proportional to the device capacitance, which, as noted above, is sensed by the circuit.

Figure 1A:
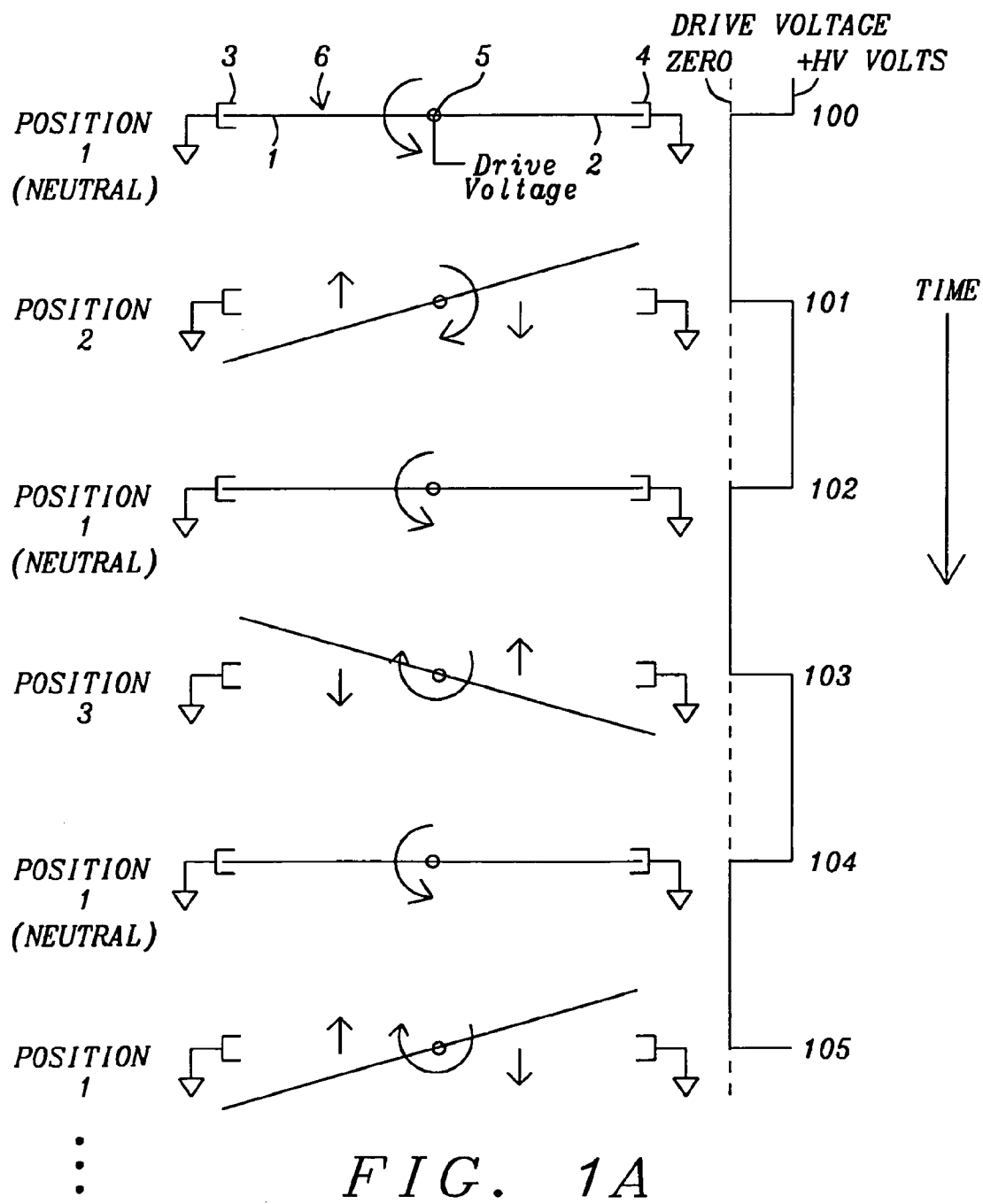
FIG. 1A (a)-(f) is a schematic sequence of (side-view) illustrations showing how the oscillating mirror MEMS device responds to various portions of the driving waveform.
Figure 1B:
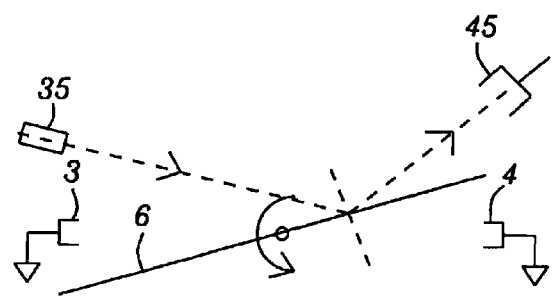
FIG. 1B is a schematic side view of the MEMS device of FIG. 1A showing a possible position of a fixed light source and photodetector to measure the angular deflection of the mirror.
Figure 1C:
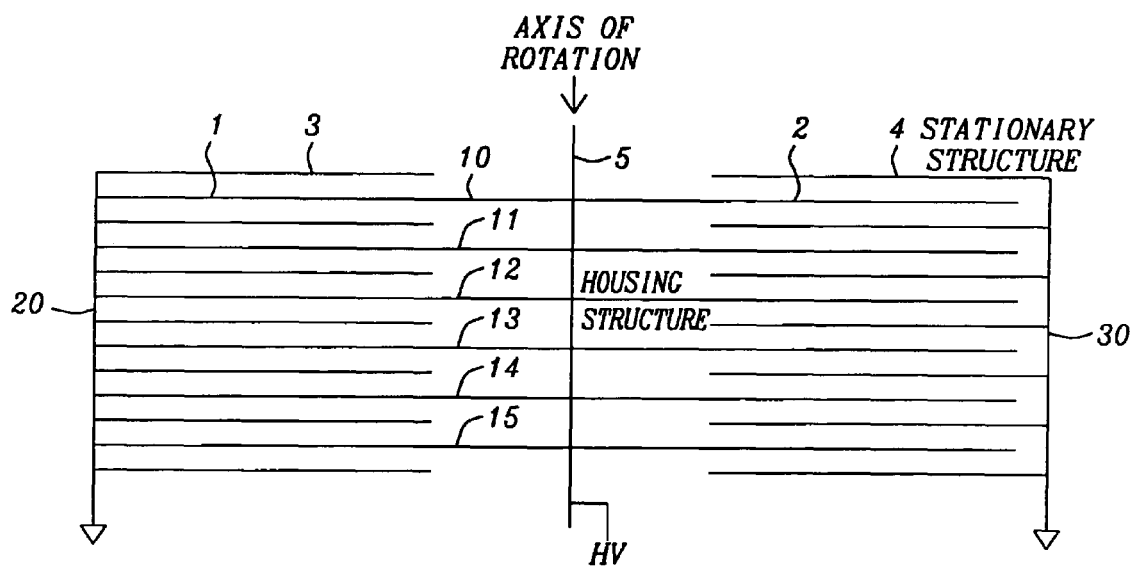
FIG. 1C is a schematic overhead view illustration of the moving and stationary components of the MEMS device of FIG. 1A.

It will be understood by those skilled in the art that such exemplary electronic circuitry can be made subject to control signals provided by inputs from externally mounted sensors, such as optical sensors (see FIG. 1B). Inputs from such sensors are not shown here. It should also be understood that such electronic circuitry can be operated under the programmatic control of microprocessors, and that such microprocessors can themselves be controlled by software or by instructions directly implemented in hardware so as to generate, for example, pulse width modulated (PWM) signals so that the electronic circuitry can generate a variety of analog waveforms.

Figure 5A:
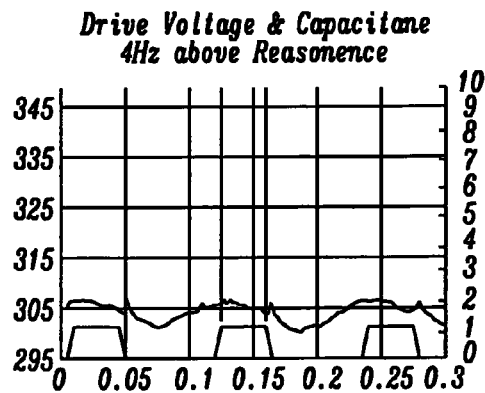
FIGS. 5a-5c are a sequence of three graphical representations showing the relationship between the drive voltage control signal and the device capacitance waveform for various drive frequencies at and above the resonant frequency.
Figure 5B:
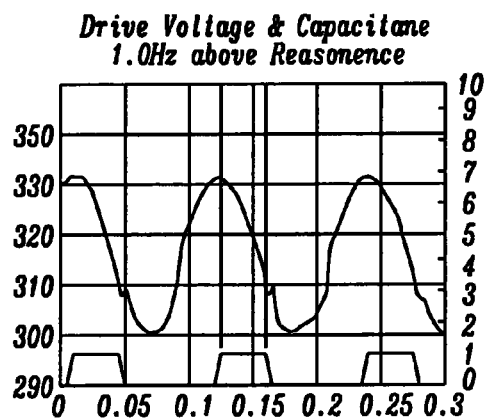
Figure 5C:
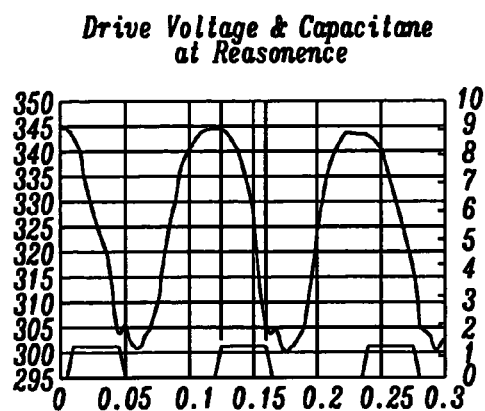

Referring next to FIGS. 5(a)-5(c), there is shown the relationship between the drive voltage control signal (square pulses at bottom of each graph) and the device capacitance waveform, for three drive frequencies at and above the resonant frequency. FIG. 5(a) shows a driving frequency 4 Hz above resonance, FIG. 5(b) shows a driving frequency 1.0 Hz above resonance and FIG. 5(c) shows a driving frequency at resonance. The amplitude of the capacitance waveform is proportional to the magnitude of the peak-to-peak motion of the mirror. The value plotted on the Y-axis is oscillator cycles per unit of time as output by the circuit of FIG. 4. Therefore, lower values correspond to higher capacitances. The lowest value on each Y-axis corresponds to the resting (neutral) position of the mirror when the angular deflection is zero (see FIG. 1A (a) for example). In its resting position, the capacitance of the MEMS device is highest. The key point to be noted is that at resonance, the midpoint of the falling slope of the capacitance waveform (see arrow) is centered on the drive voltage control signal. This point is denoted as Ttarget in FIG. 6 following and hereinafter. It is only when this coincidence of signals occurs that the device will be operating at resonance.

Figure 6:
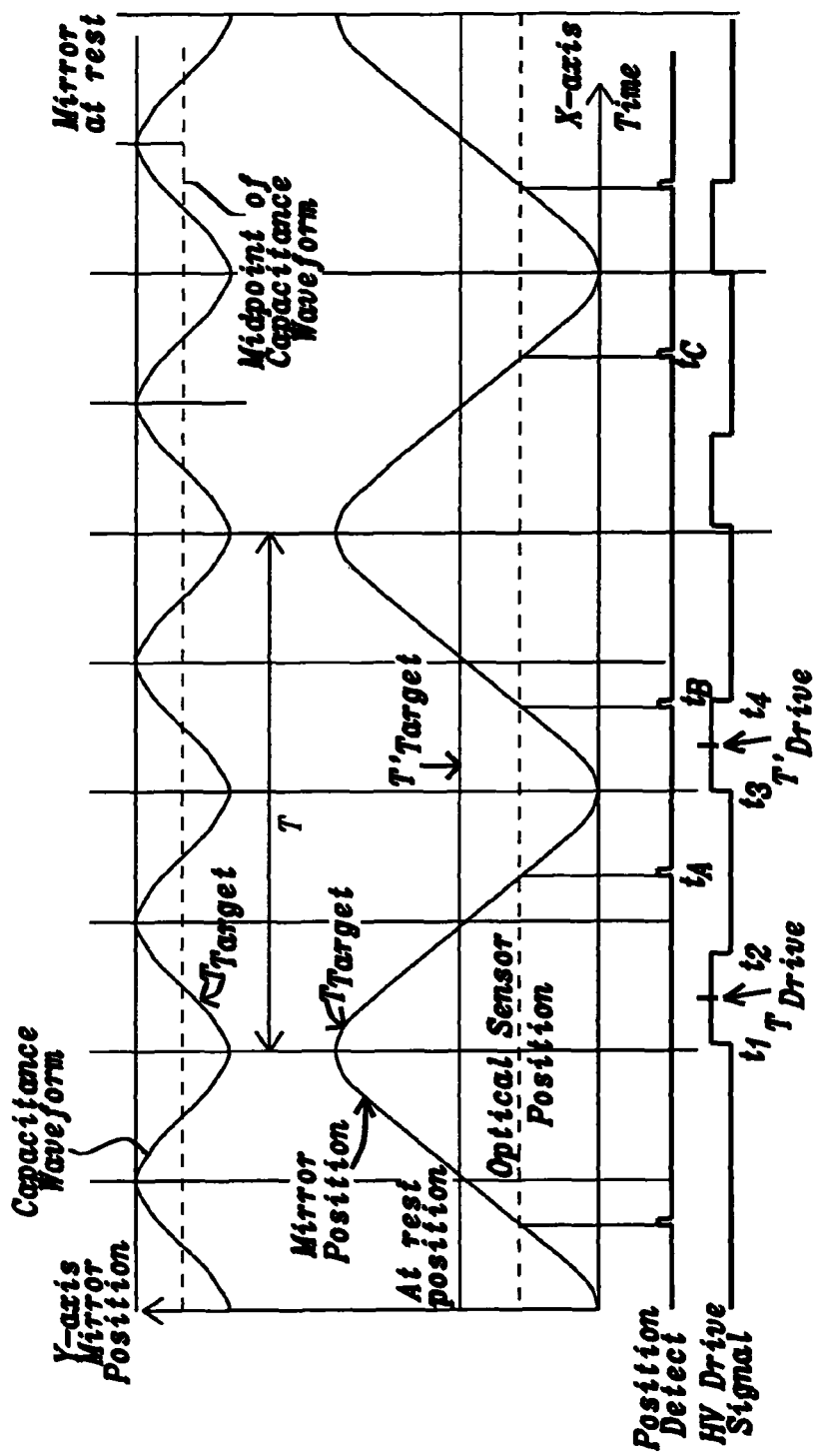
FIG. 6 is a graphical illustration showing the relationship between the drive voltage control signal, the capacitance waveform and the actual mirror motion as detected, for example, by a reflected optical beam.

Referring to FIG. 6, there is shown the relationship between the "HV drive signal" control voltage waveform (lowest signal of square wave pulses), the "capacitance waveform" (uppermost sinusoidal signal) and the actual "mirror position" (sinusoid below the capacitance waveform), such as would be observed by optically detecting the reflection of a light beam from the mirror by a fixed optical detector. The Y-axis measures the mirror position and the X-axis measures time.

If an optical sensor is placed in the path of a reflected optical beam, positional detecting pulses, ta, tb, tc, can be obtained as indicated along the "position detect" axis. The position of these pulses can be used together with the center position of the HV driving signal (Tdrive) to determine if the device is operating at resonance. Resonance exists if Ttarget=Tdrive or if T'target=T'drive, where, in terms of the beginning, t1, and end, t2, times of the first drive pulse, Tdrive is the time at the midpoint of the first drive pulse and is given by: Tdrive=½[t1+t2]. Similarly for the midpoint time of the second pulse, T'drive=½[t3+t4].

Ttarget=½[ta+tb]−⅜T, where the subtractive term −⅜T places the target at the position of the midpoint of the falling slope. The driving waveform should be centered at this position (midpoint of the falling slope), so that any pulse width will work, from a maximum pulse width of T/4 to a width approaching zero. Note that optical signal detection is preferred to capacitance signal measurement because, among other factors, the capacitance does not track the optical spot position in a linear fashion and, for small amplitude oscillations, the capacitance signal can be quite small.

Using the relationships determined in FIG. 6, the question of whether resonance has been achieved can be determined by measuring the position of the mirror and varying the drive frequency at periodic times during the driving process. A simple and efficiently operating servo system, incorporating the following closed loop algorithm which can be implemented in the pseudocode written below, will enable the determination of resonance and allow the HV drive frequency to be varied so as to maintain resonance.

First, the following initialization is performed before starting the algorithm loop:
1. Gain is set to an appropriate value<=1.0
2. StepValue is set to an appropriate value.
3. T is set to 1/(minimum safe startup frequency)
4. Integrator is set to T/Gain Then, the following algorithm is implemented.
1. Wait until one period of the IV drive cycle is complete
2. Timestamps ta and tb are determined
3. Ttarget is calculated as: Ttarget=(ta+tb)/2−(3*T/8) or T'target=(tb+tc)/2−(3*T/8)
4. Values of t1 and t2 are determined
5. Tdrive is calculated as: Tdrive=(t1+t2)/2 or T'drive=(t3+t4)/2
6. DriveError is calculated as: DriveError=Ttarget−Tdrive
7. If DriveError>0 then Integrator=Integrator−StepValue
8. If DriveError<0 then Integrator=Integrator+StepValue
9. A new value of T is computed as: T=Integrator*Gain
10. Goto step 1.

Note that T computed at step 9 (through the integration process implemented in steps 7 and 8) is used to determine drive frequency F=1/T and to control the electronics through, for example, the pulse width modulated (PWM) output of a microprocessor, to provide any desired waveform and duty cycle. Other control compensation implementations can be substituted as appropriate.

The following comments are to be noted:
1. As an alternative to implementing the above algorithm in software, it can also be implemented directly in hardware, such as through use of an FPGA (Field Programmable Gate Array) programmed in VHDL code.
2. The servo loop compensation can be different from that implemented simply in the above algorithm. For example, a PID (Proportional Integral and Differential) compensation structure can also be used in place of steps 7 and 8 in the algorithm above, wherein the PID algorithm would accept DriveError as input and provide T as output.
3. To allow faster slew to the resonant frequency, the gains and step value can be changed on-the-fly so that the overall gain is higher when the current operating frequency is further from resonance.
4. By varying amplitude of the HV driving signal in an appropriate manner, the magnitude of the mirror motion can be controlled while, at the same time, using the previous algorithm to maintain system operation at the resonant frequency.

As is understood by a person skilled in the art, the preferred embodiment of the present invention is illustrative of the present invention rather than limiting of the present invention. Revisions and modifications may be made to methods, materials, structures and dimensions employed in controlling the resonance oscillations of a forced torsional oscillating mirror MEMS device, while still forming and providing such a controlled forced torsional oscillating mirror MEMS device in accord with the spirit and scope of the present invention as defined by the appended claims.

What is claimed is:

1. A method for determining and maintaining the resonant frequency of a forced torsionally oscillating mirror MEMS device comprising:
   providing a torsionally oscillating mirror MEMS device forced by a periodic voltage impressed on said MEMS device as a driving signal;
   measuring the position of the oscillating mirror at selected times;
   determining the phase relationship between the position of the oscillating mirror and said periodic driving signal at said selected times;
   altering said phase relationship, while continually measuring said position, under the control of a servo-controlled feedback loop, until a pre-determined condition of equality between a particular point on the phase of the mirror and a corresponding point in the phase of the driving voltage is achieved, at which point the mirror is in a state of resonance.

2. The method of claim 1 wherein said oscillating mirror MEMS device comprises at least one mirror element fixed to a twistable central axis, wherein said central axis provides a torsional torque dependent upon the angular displacement of said at least one mirror element relative to a fixed horizontal axis and wherein each of the two laterally opposite ends of said at least one mirror element are adjacent to a fixed element of said substrate.

3. The method of claim 2 wherein a voltage applied to said at least one mirror element creates a torque thereon and wherein a periodic driving voltage applied to said at least one mirror element thereby creates an oscillation thereof.

4. The method of claim 1 wherein said servo-controlled feedback loop is provided by a software implemented algorithm stored within an electronic circuit having inputs and outputs, wherein said algorithm uses an input of said measured position of said oscillating mirror at regular time intervals and the resulting output of said electronic circuit is a periodic driving signal having a waveform with controlled frequency and amplitude, whereby said phase relationship is altered.

5. The method of claim 4 wherein said electronic circuit includes a microprocessor having a pulse width modulated output and wherein said algorithm controls the generation of said periodic driving signal through the output of said microprocessor to said electronic circuit.

6. The method of claim 4 wherein said servo-controlled feedback loop is provided by a hardware implemented algorithm, wherein the hardware is a field-programmable gate array.

7. The method of claim 1 wherein said measuring of said mirror position is done by measuring a capacitance variation of said MEMS device.

8. The method of claim 1 wherein said measuring of said mirror position is done by measuring the timing of a beam of light as it is reflected from a surface of said mirror and is sensed by an optical detector located at a fixed position.

9. The method of claim 3 wherein the amplitude of the driving voltage is varied in order to maintain the magnitude of the mirror motion at a fixed level.

10. The method of claim 1 wherein the magnitude of the mirror oscillation is increased from a small amount to a desired target amount in optimally chosen time steps, wherein said optimally chosen time steps are chosen so as not to overshoot the resonant frequency.

11. The method of claim 1 wherein said condition of equality corresponds to the equality of the position of a midpoint of a repeated driving pulse and the position of a phase point on the mirror position waveform corresponding to the midpoint of a falling slope portion of said mirror position waveform.

12. The method of claim 1 where said condition of equality is chosen to maintain an oscillation frequency other than resonance.

13. The method of claim 4 wherein a pseudocode representation of said software implemented algorithm has the form:
   1. Wait until one period of the HV drive cycle is complete
   2. Timestamps ta and tb are determined
   3. Ttarget is calculated as: Ttarget=(ta+tb)/2−(3*T/8) or T'target=(tb+tc)/2−(3*T/8)
   4. Values of t1 and t2 are determined
   5. Tdrive is calculated as: Tdrive=(t1+t2)/2 or T'drive=(t3+t4)/2
   6. DriveError is calculated as: DriveError=Ttarget−Tdrive
   7. If DriveError>0 then Integrator=Integrator−StepValue
   8. If DriveError<0 then Integrator=Integrator+StepValue
   9. A new value of T is computed as: T=Integrator*Gain
   10. Goto step 1.

14. An oscillating mirror MEMS device having a resonant frequency that is maintained under forcing in the presence of ambient perturbations, comprising:
   an oscillating mirror MEMS device driven by a periodic driving force wherein said periodic driving force is provided by a periodic voltage applied to said MEMS device;
   an element for measuring a positional phase of said oscillating mirror;
   electronic circuitry for producing and varying said periodic driving force;
   a closed loop servo system that iteratively varies the oscillation frequency of said mirror while comparing a phase of said periodic driving force with said positional phase of said oscillating mirror until a pre-determined equality is reached between a point on said driving force phase and a corresponding point on said positional phase, at which equality resonance exists.

15. The device of claim 14 wherein said oscillating mirror MEMS device comprises at least one mirror element fixed to a twistable central axis, wherein said central axis provides a torsional torque dependent upon the angular displacement of said at least one mirror element relative to a fixed horizontal axis and wherein each of the two laterally opposite ends of said at least one mirror element are adjacent to a fixed element of said substrate.

16. The device of claim 15 wherein a voltage applied to said at least one minor element creates a torque thereon and wherein a periodic driving voltage applied to said at least one mirror element thereby creates an oscillation thereof.

17. The device of claim 14 wherein said servo-controlled feedback loop is provided by a software implemented algorithm stored within said electronic circuit, wherein said algorithm uses as an input said measured position phase of said oscillating mirror at regular time intervals and a resulting output of said electronic circuit is a periodic driving signal having a waveform with controlled frequency and amplitude, whereby said phase relationship is altered.

18. The device of claim 17 wherein said electronic circuit includes a microprocessor having a pulse width modulated output and wherein said algorithm controls the generation of said periodic driving signal through the output of said microprocessor to said electronic circuit.

19. The device of claim 17 wherein said servo-controlled feedback loop is provided by a hardware implemented algorithm, wherein the hardware is a field-programmable gate array.

20. The device of claim 14 wherein said element for measuring of said mirror position phase is an element within said electronic circuitry for measuring a capacitance variation of said MEMS device.

21. The device of claim 14 wherein said element for measuring said mirror position phase is an optical element for sensing and timing a beam of light as said beam of light is reflected from a surface of said mirror.

22. The device of claim 14 wherein an average value of said periodic driving force is varied in order to maintain the maximum magnitude of the mirror motion at a fixed level.

23. The device of claim 17 wherein a pseudocode representation of said software implemented algorithm has the form:
 1. Wait until one period of the HV drive cycle is complete
 2. Timestamps $t_a$ and $t_b$ are determined
 3. Ttarget is calculated as: Ttarget=(ta+tb)/2−(3*T/8) or T'target=(tb+tc)/2−(3*T/8)
 4. Values of t1 and t2 are determined
 5. Tdrive is calculated as: Tdrive=(t1+t2)/2 or T'drive=(t3+t4)/2
 6. DriveError is calculated as: DriveError=Ttarget−Tdrive
 7. If DriveError>0 then Integrator=Integrator−StepValue
 8. If DriveError<0 then Integrator=Integrator+StepValue
 9. A new value of T is computed as: T=Integrator*Gain
 10. Goto step 1.

* * * * *